United States Patent [19]

Veneruso et al.

[11] Patent Number: 5,174,161
[45] Date of Patent: Dec. 29, 1992

[54] WIRELINE AND COILED TUBING RETRIEVABLE CHOKE FOR DOWNHOLE FLOW MEASUREMENT

[75] Inventors: Anthony F. Veneruso, Richmond, Tex.; Andrew Hunt, Royston, United Kingdom

[73] Assignee: Schlumberger Technology Corporation, Houston, Tex.

[21] Appl. No.: 515,907

[22] Filed: Apr. 27, 1990

[51] Int. Cl.⁵ .............................................. E21B 47/10
[52] U.S. Cl. ............................. 73/861.58; 73/861.42; 73/861.71
[58] Field of Search ................ 73/3, 861.42, 861.58, 73/861.71

[56] References Cited

U.S. PATENT DOCUMENTS

| | | | |
|---|---|---|---|
| 2,042,933 | 6/1936 | Forward | 73/198 |
| 2,767,580 | 10/1956 | Bevins | 73/861.02 |
| 3,060,737 | 10/1962 | Arragon | 73/861.02 |
| 3,455,157 | 7/1969 | Lahaye | 73/151 |
| 3,800,870 | 4/1974 | Pitts, Jr. | 166/106 |
| 3,909,603 | 9/1975 | Nicolas | 324/324 |
| 3,930,742 | 1/1976 | Boyce | 73/861 |
| 4,127,332 | 11/1978 | Thiruvengadam et al. | 366/131 |
| 4,168,624 | 9/1979 | Pichon | 73/195 |
| 4,231,262 | 11/1980 | Boll | 73/861.04 |
| 4,312,234 | 1/1982 | Rhodes et al. | 73/861.04 |
| 4,335,965 | 6/1982 | Faverty | 118/303 |
| 4,416,610 | 11/1983 | Gallagher | 366/150 |
| 4,430,251 | 2/1984 | Patterson | 252/312 |
| 4,441,361 | 4/1984 | Carlson | 73/155 |
| 4,450,715 | 5/1984 | Sumal | 73/118.1 |
| 4,528,847 | 7/1985 | Halmi | 73/861.61 |
| 4,576,043 | 3/1986 | Nguyen | 73/861.04 |
| 4,604,902 | 8/1986 | Sabin | 73/861.04 |
| 4,641,535 | 2/1987 | Malguarnera | 73/861.01 |
| 4,644,800 | 2/1987 | Kozlak | 73/861.64 |
| 4,651,572 | 3/1987 | Albertz | 73/861.63 |
| 4,757,709 | 7/1988 | Czernichow | 73/861.65 |
| 4,856,334 | 8/1989 | Hunt | 73/861.04 |
| 4,928,764 | 5/1990 | Roessler | 73/151 |

FOREIGN PATENT DOCUMENTS

| | | |
|---|---|---|
| 0235032 | 2/1987 | European Pat. Off. . |
| 142503 | 7/1980 | Fed. Rep. of Germany . |
| 1453706 | 9/1966 | France . |
| 85287910/46 | 3/1978 | Japan . |
| 0657702 | 9/1986 | Switzerland ............ 73/861.42 |
| 1089203 | 11/1967 | United Kingdom . |
| 1552476 | 9/1979 | United Kingdom . |
| 1601699 | 11/1981 | United Kingdom . |
| 2085597A | 4/1982 | United Kingdom . |
| 2124781A | 2/1984 | United Kingdom . |
| 2128756A | 5/1984 | United Kingdom . |

*Primary Examiner*—Hezron E. Williams
*Assistant Examiner*—George Dombroske
*Attorney, Agent, or Firm*—Henry N. Garrana; John H. Bouchard

[57] ABSTRACT

A method for more accurately measuring small changes in flowrate, and measuring low flowrates, of a well fluid in a pipe, adapted to be disposed in a borehole, includes inserting a choke in a constricted section of the pipe and placing a differential pressure gauge across the constricted section so as to measure the pressure of the fluid in the constricted section. The presence of the centerbody in the constricted section of the pipe decreases the pressure of the fluid in an annulus region around the choke and converts an otherwise small well fluid pressure change in the constricted section into a large pressure change in the annulus region, the large pressure change being easily measurable by the differential pressure gauge.

19 Claims, 2 Drawing Sheets

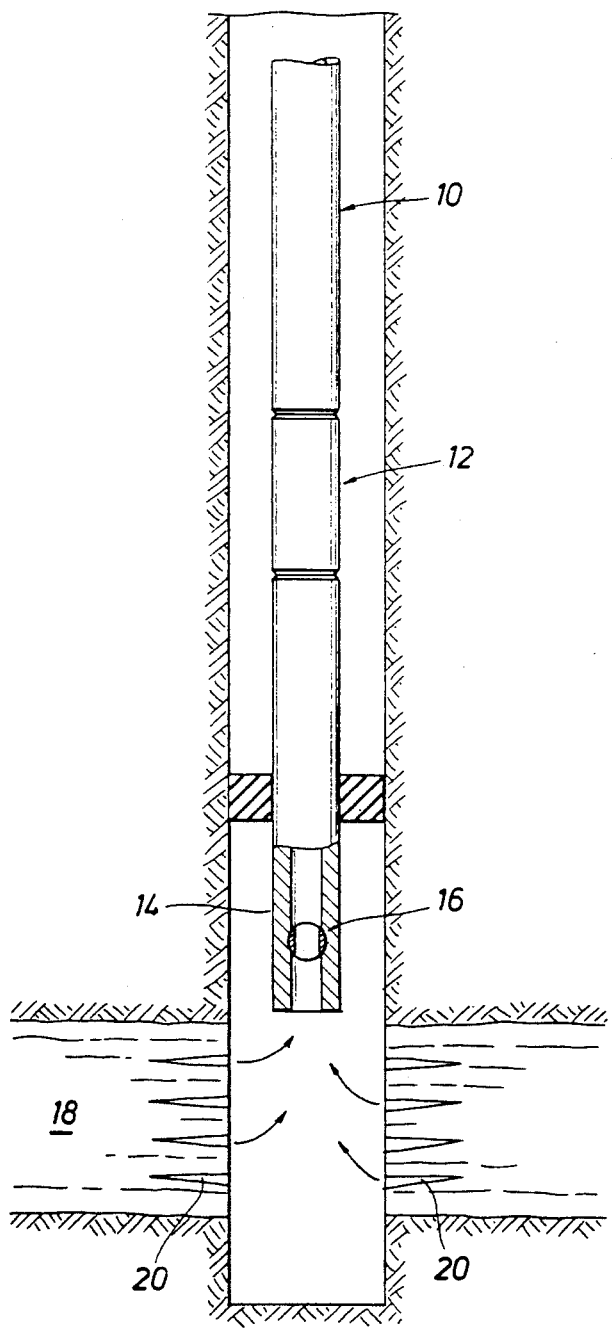
FIG.1a
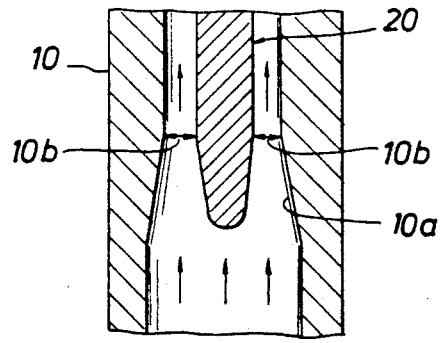
FIG.1b
FIG.2

WIRELINE AND COILED TUBING RETRIEVABLE CHOKE FOR DOWNHOLE FLOW MEASUREMENT

BACKGROUND OF THE INVENTION

The subject matter of the present invention relates to well testing, and more particularly, to a retrievable centerbody ('choke') used to facilitate downhole measurement of flowrates of fluid flowing upward in an oil well borehole.

After the borehole of an oilwell has been drilled, a section of pipe is lowered into the borehole, the pipe having certain openings disposed therethrough for receiving formation fluids and causing the fluids to move upward through the pipe. One portion of the pipe is dedicated to measuring the flowrate of the fluid flowing upward through the pipe. This portion of the pipe is constricted in terms of its diameter. As noted in U.S. Pat. No. 4,856,344, a gauge measures the differential pressure of the fluid across the constricted portion of the pipe. The differential pressure is translatable to a flowrate figure. The flowrate figure is translatable to a particular resolution in terms of barrels per day (bbl/day) of fluid, determined by the resolution of the differential pressure gauge. The lowest flowrate that can be measured occurs when the resulting differential pressure through the constriction is equal to the resolution of the pressure gauge. If the differential pressure through the constriction can be increased, or the resolution of the pressure gauge can be increased, then a lower flowrate can be measured. While a smaller constriction would produce the desired increase in delta pressure for a given flowrate, it is deemed necessary not to reduce the pipe bore beyond a certain minimum value. Therefore, an alternative solution to this problem is required in order to provide a accurate measurement of low fluid flowrates.

SUMMARY OF THE INVENTION

Accordingly, it is a primary object of the present invention to accurately position a centerbody of known dimensions into the bore of a well testing pipe to change the internal geometry therein in a precisely defined manner.

It is a further object of the present invention to increase the differential pressure across a constricted portion of the well testing pipe by inserting the centerbody within that portion of the pipe, such that the flow through the pipe is then further accelerated.

It is a further object of the present invention that the above-mentioned centerbody be conveyed on wireline cable such that the centerbody may be installed and removed as necessary.

It is a further object of the present invention that the centerbody be conveyed on coiled tubing such that the centerbody may be installed and removed in deviated wellbores as necesary.

These and other objects of the present invention are accomplished by inserting a choke (centerbody) in the constricted portion of the pipe and measuring the differential Pressure across the constriction after the choke has been inserted. Flowrate through a pipe is proportional to the velocity of the fluid flowing in the pipe and the cross-sectional area of the pipe, so if the area available to the flow is decreased the fluid velocity must increase (Continuity). An increase in fluid velocity results in a decrease in pressure (Bernoulli). Hence the presence of the choke in the constriction, by causing a reduction of the effective pipe area available to the flow and hence increasing the local fluid velocity, causes an additional pressure drop across the constriction which can be detected by the differential pressure gauge.

Since, using modern day pressure gauges, large pressure changes can be measured more accurately than small pressure changes, use of the choke allows a more accurate pressure measurement to be made across the constriction for the same flowrate. This translates to a more accurate measurement of the fluid flowrate through the well testing pipe, and the ability to measure lower flowrates which would otherwise result in pressure changes smaller than the resolution of the best pressure gauge available at the present time.

Further scope of applicability of the present invention will become apparent from detailed description presented hereinafter. It should be understood, however, that the detailed description and the specific examples, while representing a preferred embodiment of the invention, are given by way of illustration only, since various changes and modifications within the spirit and scope of the invention will become apparent to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 1a and 1b illustrates a borehole including the well testing pipe adjacent a production formation, the pipe including a flow measurement section which consists of the constricted portion;

FIG. 2 illustrates in greater detail the section of FIG. 1 including the constricted portion of the flow measurement section, the constricted portion having a choke disposed therein;

DESCRIPTION OF THE PREFERRED EMBODIMENT

Figure 4:
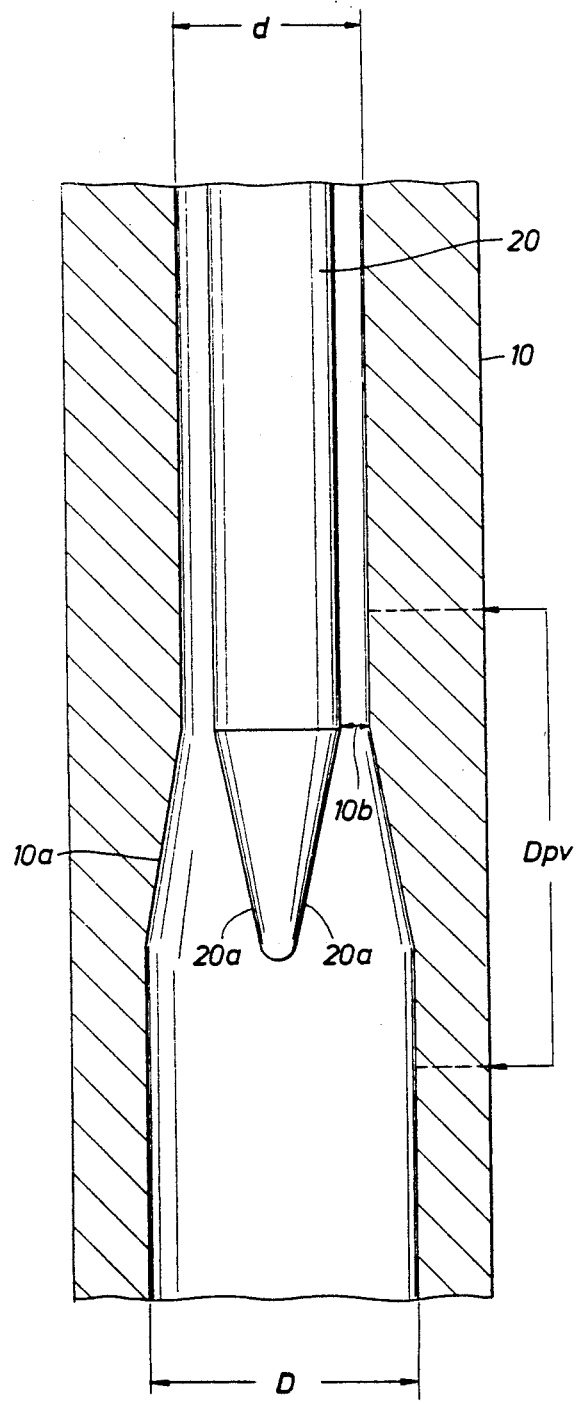
FIG. 4 illustrates an fluid-dynamically shaped choke.

Referring to FIG. 1a, a well test schematic illustrates a borehole in which a pipe is disposed, the pipe including a well testing pipe 10, a flowmeter 12, and a third section 14 of pipe, the third section 14 including a valve 16 for enabling well fluid to flow therethrough when the valve is disposed in one state and for preventing the well fluid from flowing therethrough when the valve 16 is disposed in another state. A section of borehole formation 18 produces well fluid, for example from perforated holes 20, the well fluid flowing into the third section 14 of pipe. If the valve 16 is disposed in the one state, the well fluid flows through the valve 16 and into the flowmeter 12 section of pipe. The flowmeter 12 measures the flowrate of the well fluid flowing within the well testing pipe 10.

Referring to FIG. 1b, the well testing pipe 10 is shown in cross section. The pipe 10 includes a constriction 10a wherein the inner diameter "D" on one end of the pipe 10 is greater than the inner diameter "d" on the other end of the pipe 10. A difference in pressure "delta P" of the well fluid flowing within the well testing pipe 10 is measured by a differential pressure gauge, the pressure difference existing being between the section of pipe associated with inner diameter "D" and the section of pipe associated with inner diameter "d". There is a practical limit (statistical resolution) below which the differential pressure gauge cannot measure small changes in the differential pressure "delta P"; consequently, differential pressure gauges more accurately measure larger changes in pressure. A method is needed for measuring the small changes in well fluid pressure in the constricted section of the well testing pipe 10.

Referring to FIG. 2, in accordance with the present invention, a choke 20 is inserted into the well testing pipe 10 until the choke 20 is disposed adjacent the constriction 10a of the well testing pipe 10. The presence of choke 20 adjacent constriction 10a causes the well fluid flowing in an annulus region 10b of pipe 10, between the choke 20 and an inner wall of the constriction 10a, to flow more rapidly. Flowrate through a pipe is proportional to the velocity of the fluid flowing in the pipe and the cross-sectional area of the pipe. If the area available to the flow is decreased, the fluid velocity must increase. An increase in fluid velocity results in a decrease in pressure. Therefore, the increase in the velocity of the well fluid in the annulus region 10b, due to the existence of choke 20 in the constriction, causes a corresponding decrease in the pressure of the well fluid in the annulus region 10b. If a differential pressure gauge were connected to pipe 10 of FIG. 1b so as to measure the differential pressure "delta P" in FIG. 1b, the decrease in pressure, experienced when the choke 20 is inserted in pipe 10, would convert an otherwise small change in pressure into a larger change in pressure, the larger change in pressure being easily detectable by the differential pressure gauge measuring the "delta P" of FIG. 1b. Consequently, if small changes in the well fluid flowrate are experienced in the well testing pipe 10 of FIG. 2, and if the choke 20 is inserted in the pipe 10 in the manner indicated in FIG. 2, the small changes in well fluid would be easily detectable by the differential pressure gauge connected to pipe 10. The choke 20 of FIG. 2 may be lowered into the well testing pipe 10 on a wireline after the well testing pipe is already disposed in a borehole. Alternatively, after the well testing pipe is already disposed in a borehole, the choke 20 of FIG. 2 may be connected to coiled tubing at the well head, transported into the well testing pipe when connected to the coiled tubing, and positioned into place within the well testing pipe in response to manipulation of the coiled tubing.

Figure 3:
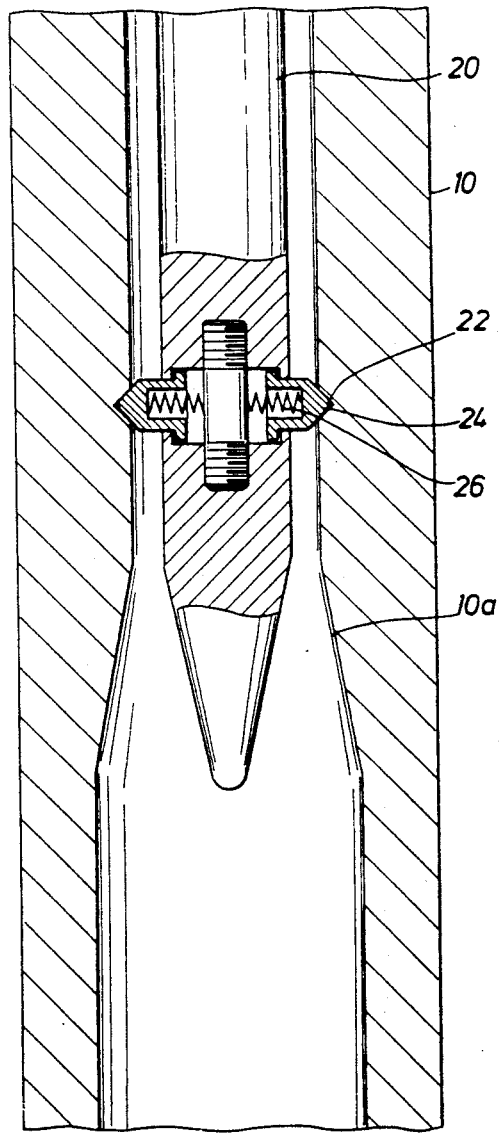
FIG. 3 illustrates the choke of FIG. 2 including a latch mechanism for latching the choke to the constricted portion of the well testing pipe.

Referring to FIG. 3, the choke 20 of FIG. 2 is illustrated, the choke 20 further including a latch mechanism 22 which mates with an interior groove 24 formed in the interior wall of the well testing pipe 10. The latch mechanism 22 is spring biased by a spring 26 which biases the latch 22 into engagement with the interior groove 24, when the choke 20 is disposed appropriately within the well testing pipe 10. However, a pull upwardly on the choke 20 moves the latch 22 radially inward and out of engagement with the interior groove 24. As a result, the choke 20 may be removed from its position within the well testing pipe 10.

Referring to FIG. 4, the choke 20 includes an fluid-dynamically shaped pointed tip portion 20a, the fluid-dynamically shaped tip portion 20a enabling the well fluid to easily pass into the annulus region 10b between the choke 20 and the well testing pipe 10 and more easily causing the corresponding decrease in the pressure of the well fluid in the annulus region 10b to occur. As noted above, the decrease in pressure in the annulus region 10b converts the otherwise small change in pressure into the larger change in pressure, the larger change in pressure being more easily detectable by the differential pressure gauge measuring the change in pressure "Dpv" shown in FIG. 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of measuring a change in pressure across a constricted portion of a well testing pipe disposed in a borehole, comprising the steps of:

inserting a centerbody into said pipe until said centerbody is disposed adjacent the constricted portion of said pipe, said centerbody including a fluid-dynamically shaped tip end and suspending by wireline when said centerbody is inserted into said pipe; and measuring the change in pressure across the constricted portion of said pipe.

2. The method of claim 1, wherein said centerbody includes a latch means for latching and unlatching to said well testing pipe when disposed adjacent to said constricted portion of said pipe.

3. An apparatus for measuring a change in pressure of a fluid flowing through a constricted portion of a pipe, comprising:

a centerbody disposed within said pipe and adjacent said constricted portion of said pipe, said centerbody having a fluid-dynamically shaped tip end portion, the fluid-dynamic shape of said tip end of said centerbody enabling said pressure of said fluid to more easily decrease when said fluid is flowing through said constricted portion of said pipe; and means for measuring said change in pressure of said fluid flowing through said constricted portion of said pipe, the presence of said centerbody adjacent said constricted portion in said pipe decreasing a fluid pressure in an annulus region surrounding said centerbody, the decrease in fluid pressure in said annulus region enabling said change in fluid pressure across said constricted portion to be more easily measured.

4. The apparatus of claim 3, further comprising latch means connected to said centerbody for latching said centerbody to said pipe when said centerbody is disposed adjacent said constricted portion.

5. A method of measuring a change in pressure across a constricted portion of a well testing pipe disposed in a borehole, comprising the steps of:

suspending a centerbody having a fluid dynamically shaped tip end on an apparatus and lowering said centerbody into said well testing pipe until said tip end of said centerbody is disposed adjacent the constricted portion of said well testing pipe; and measuring the change in pressure across the constricted portion of said pipe.

6. The method of claim 5, wherein said apparatus is a wireline.

7. The method of claim 5, wherein said centerbody includes a latch means for latching to said well testing pipe when said tip end of said centerbody is disposed adjacent said constricted portion of said well testing pipe.

8. The method of claim 7, wherein said apparatus is a coiled tubing, said centerbody being connected to said coiled tubing at a well head and being lowered into said well testing pipe by manipulation of said coiled tubing.

9. An apparatus for determining a flowrate of a well fluid flowing through a constricted portion of a well testing pipe disposed in a borehole, comprising:
 a suspension apparatus; and
 a centerbody connected to said suspension apparatus, said centerbody being lowered into said well testing pipe in response to manipulation of said suspension apparatus and including a fluid dynamically shaped tip end portion which is disposed adjacent to said constricted portion of said well testing pipe when said suspension apparatus lowers said centerbody into said well testing pipe to a point where said tip end portion is adjacent said constricted portion, the tip end of said centerbody enabling a pressure of said fluid flowing in said constricted portion of said pipe to decrease, the decrease in said pressure creating a change in pressure across said constricted portion, said flowrate being determined in accordance with said change in pressure.

10. The apparatus of claim 9, further comprising:
 latch means on said centerbody for latching said centerbody to said well testing pipe when said tip end of said centerbody is disposed adjacent said constricted portion of said well testing pipe.

11. The apparatus of claim 9, wherein said suspension apparatus is a wireline.

12. The apparatus of claim 11, further comprising:
 latch means on said centerbody for latching said centerbody to said well testing pipe when said tip end of said centerbody is disposed adjacent said constricted portion of said well testing pipe.

13. The apparatus of claim 9, wherein said suspension apparatus is a coiled tubing.

14. The apparatus of claim 13, further comprising:
 latch means on said centerbody for latching said centerbody to said well testing pipe when said tip end of said centerbody is disposed adjacent said constricted portion of said well testing pipe.

15. A method of measuring a change in pressure of a well fluid flowing across a constricted portion of a well testing pipe disposed in a borehole, comprising the steps of:
 inserting a centerbody having a fluid dynamically shaped tip end into said well testing pipe until said tip end is disposed adjacent said constricted portion of said pipe; and
 measuring a change in pressure of said well fluid across the constricted portion of said pipe.

16. The method of claim 15, wherein the inserting step comprises the steps of:
 connecting said centerbody to a coiled tubing; and
 lowering said centerbody followed by said coiled tubing into said well testing pipe until said tip end of said centerbody is disposed adjacent said constricted portion of said well testing pipe.

17. The method of claim 16, wherein the inserting step further comprises the step of:
 latching said centerbody to said well testing pipe when said tip end of said centerbody is disposed adjacent said constricted portion of said well testing pipe.

18. Apparatus for determining a fluid flowrate in a pipe, said pipe including a first section having a first inner diameter and a second section having a second inner diameter which is less than said first inner diameter, comprising:
 pipe constriction means disposed between said first section and said second section of said pipe for gradually decreasing an inner diameter of said pipe from said first inner diameter to said second inner diameter; and
 a centerbody having a fluid-dynamically shaped tip end portion, said tip end portion being adapted to be inserted into said second section of said pipe until said tip end portion is disposed within said pipe constriction means,
 said fluid flowing from said first section to said second section of said pipe via said pipe constriction means when said tip end portion of said centerbody is disposed within said pipe constriction means thereby creating a fluid pressure drop across said pipe constriction means,
 said fluid flowrate being determined in accordance with said fluid pressure drop.

19. The apparatus of claim 18, further comprising:
 latch means disposed on said centerbody for latching said centerbody to said pipe when said tip end portion of said centerbody is disposed within said pipe constriction means.

* * * * *